US012499657B2

(12) United States Patent
Kale et al.

(10) Patent No.: US 12,499,657 B2
(45) Date of Patent: Dec. 16, 2025

(54) VIDEO STREAM AUGMENTATION USING A DEEP LEARNING DEVICE

(71) Applicant: Micron Technology, Inc., Boise, ID (US)

(72) Inventors: Poorna Kale, Folsom, CA (US); Saideep Tiku, Folsom, CA (US); Robert Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 158 days.

(21) Appl. No.: 17/953,042

(22) Filed: Sep. 26, 2022

(65) Prior Publication Data

US 2024/0104897 A1    Mar. 28, 2024

(51) Int. Cl.
*G06V 10/77* (2022.01)
*B60R 1/12* (2006.01)
*B60R 1/22* (2022.01)
*G01S 7/48* (2006.01)
*G01S 17/08* (2006.01)
*G01S 17/89* (2020.01)
*G06V 10/20* (2022.01)
*G06V 10/60* (2022.01)

(Continued)

(52) U.S. Cl.
CPC ............... *G06V 10/77* (2022.01); *B60R 1/12* (2013.01); *B60R 1/22* (2022.01); *G01S 7/4808* (2013.01); *G01S 17/08* (2013.01); *G01S 17/89* (2013.01); *G06V 10/20* (2022.01); *G06V 10/60* (2022.01); *G06V 20/41* (2022.01); *G06V 20/58* (2022.01); *H04N 7/183* (2013.01); *B60R 2001/1253* (2013.01); *B60R 2300/105* (2013.01); *B60R 2300/30* (2013.01); *G06V 2201/08* (2022.01)

(58) Field of Classification Search
CPC ........ G06V 10/77; G06V 10/20; G06V 10/60; G06V 20/41; G06V 20/58; G06V 2201/08; B60R 1/12; B60R 1/22; B60R 2001/1253; B60R 2300/105; B60R 2300/30; B60R 1/00; G01S 7/4808; G01S 17/08; G01S 17/89; H04N 7/183
USPC ........................................................ 348/148
See application file for complete search history.

(56) References Cited

U.S. PATENT DOCUMENTS 10,752,253 B1 * 8/2020 Nath ................ B60W 50/14
11,770,505 B1 * 9/2023 Nguyen ............... H04N 5/77
348/148

(Continued)

*Primary Examiner* — Jared Walker
(74) *Attorney, Agent, or Firm* — Holland & Hart LLP

(57) ABSTRACT

Methods, systems, and devices for video stream augmentation using a deep learning device are described. A machine learning device of a vehicle may augment a video stream received from cameras of the vehicle and may output the augmented video stream to a display component of the vehicle. For example, a camera of the vehicle may record a video stream of and a sensor of the vehicle may detect information about an environment associated with the vehicle. The camera and sensor may transmit the video stream and information, respectively, to the machine learning device, which may process and modify the video stream based on parameters of the video stream and/or the information. The machine learning device may transmit the modified video streams to the display component, and the display component may display aspects of the modified video stream on a display of the vehicle, such as a rearview mirror.

25 Claims, 5 Drawing Sheets

(51) Int. Cl.
*G06V 20/40* (2022.01)
*G06V 20/58* (2022.01)
*H04N 7/18* (2006.01)

(56) References Cited

U.S. PATENT DOCUMENTS

| | | | |
|---|---|---|---|
| 2016/0229341 A1* | 8/2016 | Singhal | B60R 11/04 |
| 2017/0259814 A1* | 9/2017 | Fujimura | G08G 1/16 |
| 2018/0022278 A1* | 1/2018 | Parat | B60R 1/12 348/148 |
| 2018/0191966 A1* | 7/2018 | VanVuuren | H04N 7/181 |
| 2019/0047559 A1* | 2/2019 | Conde | B60W 30/0956 |
| 2019/0084481 A1* | 3/2019 | Diedrich | B60R 1/04 |
| 2019/0155300 A1* | 5/2019 | Tiwari | H04N 13/243 |
| 2020/0026278 A1* | 1/2020 | Khanna | G06N 3/045 |
| 2020/0172123 A1* | 6/2020 | Kubota | B60K 35/28 |
| 2020/0241824 A1* | 7/2020 | Lee | G06F 3/017 |
| 2020/0279514 A1* | 9/2020 | Lee | B60K 35/22 |
| 2020/0349365 A1* | 11/2020 | Behrendt | G06V 10/454 |
| 2021/0142146 A1* | 5/2021 | Kale | G06V 10/82 |
| 2021/0241003 A1* | 8/2021 | Seo | G06V 20/56 |
| 2021/0300401 A1* | 9/2021 | Hashimoto | G06V 20/58 |
| 2021/0400315 A1* | 12/2021 | Kale | G06V 20/52 |
| 2022/0032945 A1* | 2/2022 | Schumacher | B60K 35/80 |
| 2022/0041105 A1* | 2/2022 | Jochmann | B60R 11/04 |
| 2022/0191449 A1* | 6/2022 | Matsubara | H04N 9/77 |
| 2022/0300072 A1* | 9/2022 | Arar | G06F 18/2148 |
| 2022/0351525 A1* | 11/2022 | Carson | G06V 20/58 |
| 2022/0368860 A1* | 11/2022 | Shinohara | G06V 20/56 |
| 2022/0375230 A1* | 11/2022 | Makita | G06V 20/58 |
| 2022/0417484 A1* | 12/2022 | Akimoto | H04N 7/183 |
| 2024/0104897 A1* | 3/2024 | Kale | G06V 20/58 |

\* cited by examiner

VIDEO STREAM AUGMENTATION USING A DEEP LEARNING DEVICE

FIELD OF TECHNOLOGY

The following relates to one or more systems for memory, including video stream augmentation using a deep learning device.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not- and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
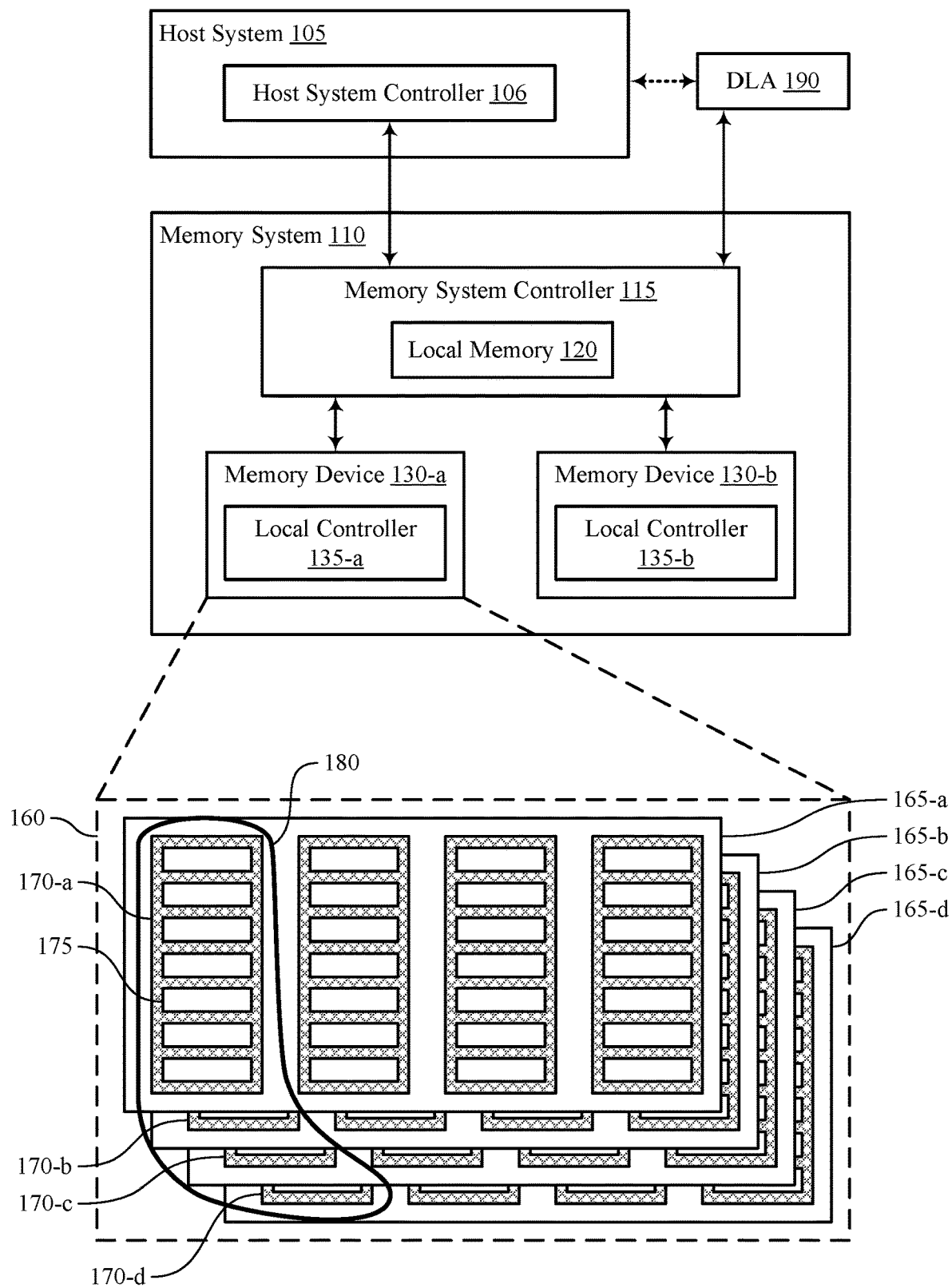
FIG. 1 illustrates an example of a system that supports video stream augmentation using a deep learning device in accordance with examples as disclosed herein.

Some systems, such as a vehicle system, may implement devices or computing components that interact with the vehicle system or an environment associated with the vehicle system. For example, a vehicle may include devices or computing devices that may include sensors for measuring physical properties associated with the vehicle or an environment of the vehicle and actuators configured to control various vehicle systems or subsystems. The sensors may include devices such as a camera, a non-visible light detection device (e.g., infrared (IR) light cameras), a motion sensor, a radar sensor, a speedometer, a gas meter, a fuel temperature sensor, an oxygen sensor, a light detection and ranging (LiDAR) sensor, among other types of sensors that may gather information about the environment or the vehicle. Additionally, the vehicle may include one or more machine learning devices, such as a deep learning accelerator (DLA), which may provide advantages over general-purpose computers. For example, a DLA may perform tasks such as machine vision, voice recognition, object identification, and natural language processing (e.g., among others), more rapidly while using less power compared to if a general-purpose computer were to perform such tasks, for example, by implementing one or more machine learning models (e.g., neural networks) trained to perform such tasks.

As described herein, a vehicle system may use one or more DLAs to augment a video stream captured (e.g., recorded, obtained, detected) by one or more cameras of the vehicle system, and may transmit (e.g., output) the augmented video streams to a display component of the vehicle system for display, such as a rearview mirror. For example, sensors of the vehicle system may capture one or more video streams of an environment associated with the vehicle system, as well as other information such as a speed of the vehicle system, nearby vehicles, distances to the nearby vehicles, and speeds of the nearby vehicles, among other information. The sensors may transmit the one or more video streams and information to a compute platform that includes the one or more DLAs (e.g., to the one or more DLAs, to a processor of the vehicle subsystem that includes or is coupled with the one or more DLAs). The compute platform (e.g., using the one or more DLAs) may process the video streams and information to modify the video streams to include environmental information or other modifications, such as an indication of the nearby vehicles, video filters to reduce glare, masks to reduce a brightness of detected objects, or a combination thereof, among other types of modifications described herein. The compute platform may transmit the modified video streams to the display component, and the display component may display aspects of the modified video stream, for example on a rearview mirror. Such techniques will provide an operator of the vehicle system with valuable information, which will allow for increased safety and enhanced user experience associated with operating the vehicle system. Additionally, by using one or more DLAs to implement such video stream modification, processing resources and power consumption associated with the video stream modification will be reduced, thereby reducing an effect of performing such video stream modification on a battery life of the vehicle system, among other benefits.

It is noted that while various examples provided herein are discussed for vehicle system implementations, such video stream augmentation techniques may be implemented in other systems. For example, other systems that capture video streams of associated environments for display at a display component (e.g., drones, planes) may implement DLAs to process and modify video streams as described herein.

Figure 2:
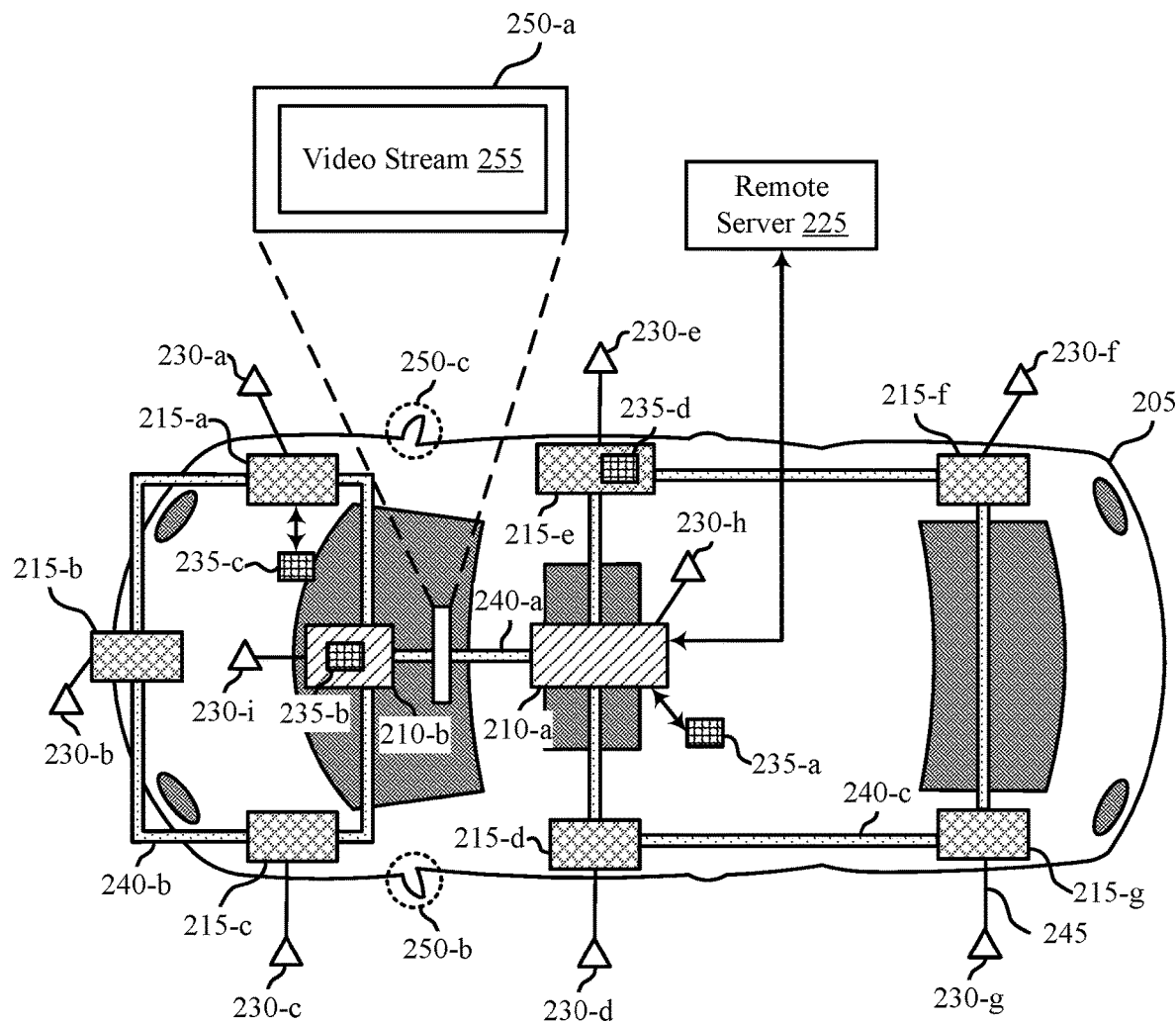
FIG. 2 illustrates an example of a system that supports video stream augmentation using a deep learning device in accordance with examples as disclosed herein.
Figure 3:
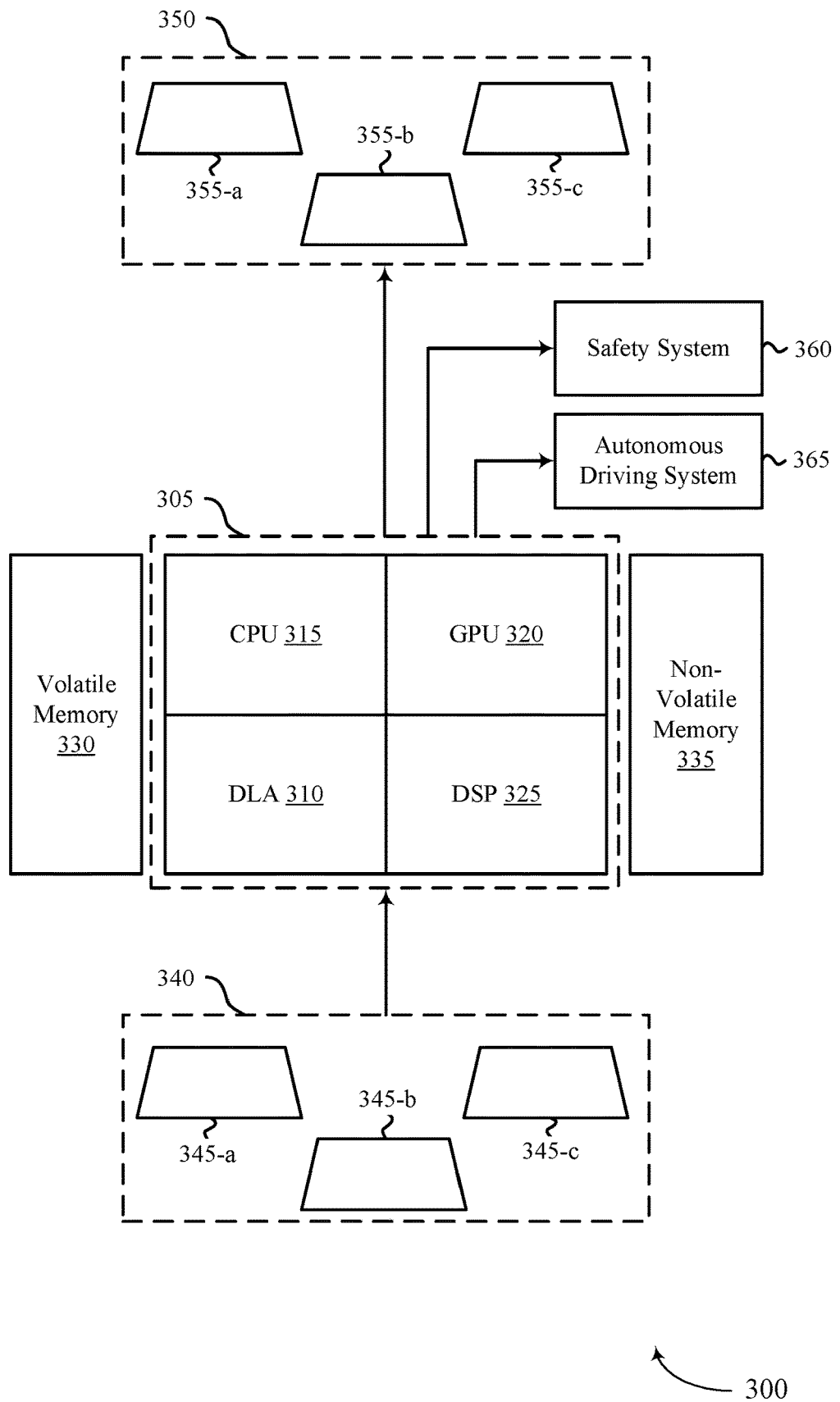
FIG. 3 illustrates an example of a system that supports video stream augmentation using a deep learning device in accordance with examples as disclosed herein.

Features of the disclosure are initially described in the context of systems with reference to FIGS. 1 through 3.

Figure 4:
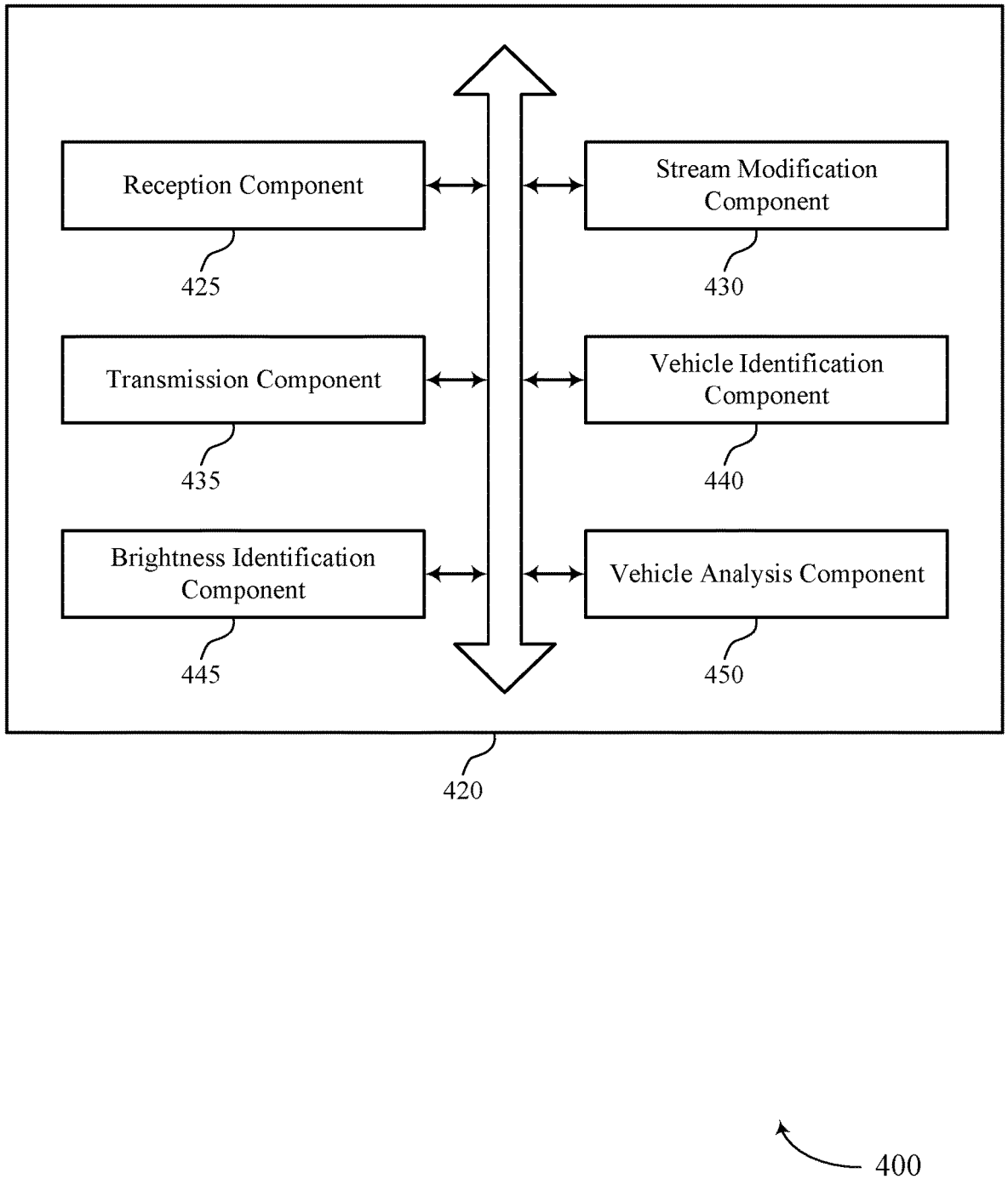
FIG. 4 shows a block diagram of a deep learning device that supports video stream augmentation using a deep learning device in accordance with examples as disclosed herein.
Figure 5:
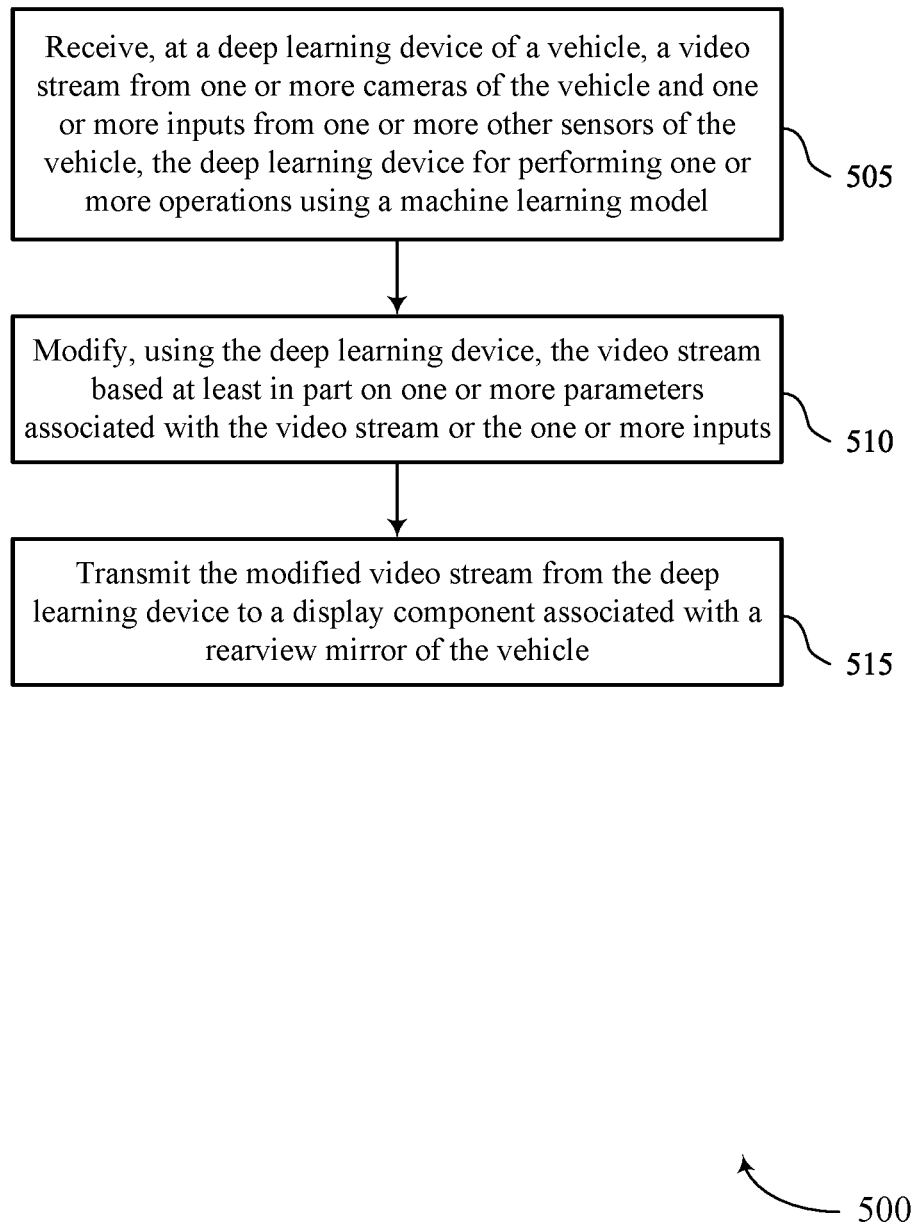
FIG. 5 shows a flowchart illustrating a method or methods that support video stream augmentation using a deep learning device in accordance with examples as disclosed herein.

These and other features of the disclosure are further illustrated by and described in the context of an apparatus diagram and flowchart that relate to video stream augmentation using a deep learning device with reference to FIGS. 4 through 5.

FIG. 1 illustrates an example of a system 100 that supports video stream augmentation using a deep learning device in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations-which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a. 165-b, 165-c, and 165-d, respectively, and blocks 170-a. 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support video stream augmentation using a deep learning device. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The system 100 may include one or more DLAs 190, which may be coupled with the memory system 110, the host system 105, or a combination thereof. A DLA 190 may be an example of a deep learning device which may use a machine learning model (e.g., one or more neural networks) to perform various operations. For example, the DLA 190 may include one or more neural networks that are trained to perform various inference tasks, such as data analytics, machine vision, voice recognition, and natural language processing, among other tasks for which neural networks may be trained. In some examples, the DLA 190 may include a processor chipset and a software stack executed by the processor chipset. The processor chipset may include one or more cores, one or more caches (e.g., memory local to or included in the DLA 190), and a storage protocol controller (e.g., PCIe controller), among other components. In some cases, the DLA 190 may be a field programmable gate array (FPGA) based device, such as a modular FPGA-based architecture that implements an inference engine that may be tuned for various neural networks. In some examples, the DLA 190 may operate multiple neural networks concurrently. In some examples, a neural network may be implemented on a single DLA 190 or across multiple DLAs 190. The DLA 190 may be trained to perform or support one or more operations of the host system 105 using one or more neural networks.

The memory system 110 may be incorporated into (e.g., included in, added to) a zonal computing system of a vehicle, for example, to assist in augmenting or modifying (or both) video streams associated with a zonal computing system of a vehicle using the DLA 190. For example, the zonal computing system may include devices, such as sensors or actuators, that are configured to interact with the vehicle or the environment associated with the vehicle. Additionally, the zonal computing system may include one or more central processors configured to communicate information with the devices and manage some operations of the vehicle based on the communicated information. The information may be routed through one or more gateway processors of the zonal computing system. In some examples, the memory system 110 may be used to store information routed between various components of the zonal computing system (e.g., sensors, actuators, processors, DLAs 190). In some examples, the memory system 110 may support authentication capabilities, for example, to verify whether devices of the zonal computing system are trusted devices and may to enable or disable communications with the devices accordingly. In some examples, the host system 105 may be included in the zonal computing system of the vehicle. For instance, the host system 105 may be an example of a central processor of the zonal computing system, a gateway processor of the zonal computing system, or a device of the zonal computing system.

The vehicle may use one or more DLAs 190 to augment a video stream captured by one or more cameras of the vehicle and may display the augmented video streams using a display component, such as a rearview mirror. For example, sensors of the vehicle may capture a video stream of an environment associated with the vehicle, as well as other information such as a speed of the vehicle, nearby vehicles, distances to the nearby vehicles, and speeds of the nearby vehicles. The sensors may transmit the video stream and information to a compute platform that includes the one or more DLAs 190, and the compute platform (e.g., using the one or more DLAs 190) may process the video stream and information to modify the video stream to include environmental information or other modifications. For example, the compute platform may modify the video stream to include an indication of the nearby vehicles, video filters to reduce glare, masks to reduce a brightness of detected objects, or a combination thereof, among other types of modification described herein. The compute platform may transmit the modified video stream to the display component, and the display component may overlay aspects of the modified video stream, for example on a rearview mirror. Such techniques will provide an operator of the vehicle with valuable information, which may allow for increased safety and enhanced user experience associated with operating the vehicle. Additionally, by using one or more DLAs to implement such video stream modification, processing resources and power consumption associated with the video stream modification will be reduced, thereby reducing an effect of performing such video stream modification on a battery life of the vehicle system, among other benefits.

It is noted that, in some examples, the techniques described herein are described with reference to the memory system 110 being a NAND memory system, however, the techniques described herein may be adapted and applied to support such techniques within any type of memory system (e.g., a DRAM system, an FeRAM system, a PCM system, etc.).

FIG. 2 illustrates an example of a system 200 that supports video stream augmentation using a deep learning device in accordance with examples as disclosed herein. The system 200 may implement or be implemented by aspects of the system 100 described with reference to FIG. 1. For example, the system 200 may depict operation of a zonal computing system of a vehicle 205 that includes various components, such as central processors 210, gateway processors 215, memory systems, devices 230, and DLAs 235 which may be examples of corresponding devices described with reference to FIG. 1. In some cases, devices 230 may include devices such as sensors or actuators for the system 200. Additionally, the system 200 may support the utilization of machine learning processes via the DLAs 310 to enable tasks such as video stream augmentation, machine vision, voice recognition, and natural language processing, among other tasks.

The vehicle 205 may implement a zonal computing system to manage various devices that may be included in the vehicle 205. For example, the vehicle 205 may include a zonal computing system in which different groups of components of the vehicle 205 are divided into various zones and managed in accordance with the zones. The zonal computing system may include one or more central processors 210 that are configured to communicate with a remote server 225. For example, the zonal computing system may include a central processor 210-$a$ and a central processor 210-$b$ that may each be configured to communicate with the remote server 225. In some examples, the remote server 225 may provide the vehicle 205 access to a network, and the vehicle 205 may receive data from the network via the remote server 225. In some examples, the remote server 225 may be an example of a cloud server. The central processors 210 may communicate with the remote server 225 wirelessly, for example, using one or more antennas of the vehicle 205 in accordance with one or more radio access technologies.

The central processors 210 may additionally be configured to communicate with various zones of the zonal computing system. For example, the zonal computing system may include: gateway processors 215; and devices 230, which may include actuators that are configured to control (e.g., trigger, cause, or perform actions with) a subsystem of the vehicle 205 or sensors that are configured to measure (e.g., record, capture, detect, track) a physical property associated with the vehicle 205 or an environment associated with the vehicle 205 (e.g., a motion sensor, a camera, a radar sensor, a speedometer, a gas meter, a fuel temperature sensor, an oxygen sensor, a LiDAR sensor, or some other sensor that may be included in the vehicle 205), among other computing components that may be included in the zonal computing system. Each of the gateway processors 215 and devices 230 may be associated with a respective zone of the zonal computing system. The gateway processors 215 may be coupled with at least one of the central processors 210 (e.g., directly or via one or more other gateway processors 215) and with one or more devices 230, or a combination thereof. Additionally, the gateway processors 215 may be configured to route communications between the at least one central processor 210 and the respective devices 230 with which the gateway processors 215 are coupled. Accordingly, the central processors 210 may be configured to communicate with devices 230 of a zone via one or more gateway processors 215 associated with the zone. In some examples, a zone may include a communication path coupled with one or more gateway processors 215.

In the example of FIG. 2, the zonal computing system may include a gateway processor 215-$a$, a gateway processor 215-$b$, a gateway processor 215-$c$, a gateway processor 215-$d$, a gateway processor 215-$e$, a gateway processor 215-$f$, and a gateway processor 215-$g$, although any quantity of gateway processors 215 may be included in the zonal computing system of the vehicle 205. In some examples, each gateway processor 215 may be associated with a different zone of the zonal computing system. For example, the gateway processor 215-$a$ may be associated with a first zone of the zonal computing system, the gateway processor 215-$b$ may be associated with a second zone of the zonal computing system, the gateway processor 215-$c$ may be associated with a third zone of the zonal computing system, and so on. In other examples, multiple gateway processors 215 may be associated a single zone of the zonal computing system. For example, the gateway processor 215-$a$, the gateway processor 215-$b$, and the gateway processors 215-$c$ may be associated with the first zone; the gateway processor 215-$d$ and the gateway processor 215-$e$ may be associated with the second zone, and the gateway processor 215-$f$ and the gateway processor 215-$g$ may be associated with the third zone. In some examples, the central processors 210 may be coupled with one or more devices 230. For example, the central processor 210-$a$ may be coupled with a device 230-$h$, and the central processor 210-$b$ may be coupled with a device 230-$i$. In some examples, the device 230-$h$ and 230-$i$ may be associated with different zones of the zonal computing system or with one of the zones with which the central processors 210 are configured to communicate (e.g., one of the zones associated with a gateway processor 215).

The devices 230 included in the vehicle 205 may be associated with the respective zones of the gateway processors 215 with which they are coupled. For example, in the example of FIG. 2, the gateway processor 215-$a$ may be coupled with a device 230-$a$, the gateway processor 215-$b$ may be coupled with a device 230-$b$, the gateway processor 215-$c$ may be coupled with a device 230-$c$, the gateway processor 215-$d$ may be coupled with a device 230-$d$, the gateway processor 215-$e$ may be coupled with a device 230-$e$, the gateway processor 215-$f$ may be coupled with a device 230-$f$, and the gateway processor 215-$g$ may be coupled with a device 230-$g$. Each of the devices 230-$a$ through 230-$g$ may be associated with (e.g., included in) the zone with which the corresponding gateway processor 215 is associated (e.g., the first zone through a seventh zone, respectively).

The components of the zonal computing system may communicate according to various communication protocols. For example, the central processors 210 and the gateway processors 215 may be coupled over various signal buses 240 that operate according to a first communication protocol. For instance, the central processor 210-$a$ and the central processor 210-$b$ may communicate over a signal bus 240-$a$. The central processor 210-$b$ may communicate with the gateway processor 215-$a$, the gateway processor 215-$b$, and the gateway processor 215-$c$ over a signal bus 240-$b$. The central processor 210-$a$ may communicate with the gateway processor 215-$d$, the gateway processor 215-$e$, the gateway processor 215-$f$, and the gateway processor 215-$g$ over a signal bus 240-$c$. In some examples, the central processors 210 may communicate with the gateway processors 215 directly or indirectly over the signal buses 240. For example, the central processor 210-$b$ may be directly coupled with the gateway processor 215-$a$ and the gateway processor 215-$c$ over the signal bus 240-$b$ and indirectly coupled with the gateway processor 215-$b$ over the signal bus 240-$b$ via the gateway processor 215-$a$, the gateway processor 215-$c$, or both. Thus, communications between the central processor 210-$b$ and the gateway processor 215-$b$ may be routed through the gateway processor 215-$a$, the gateway processor 215-$c$, or both. Additionally, the central processor 210-$a$ may be directly coupled with the gateway processor 215-$d$ and the gateway processor 215-$e$ over the signal bus 240-$c$ and indirectly coupled with the gateway processor 215-$f$ and the gateway processor 215-$g$ over the signal bus 240-$c$. In some examples, the signal buses 240 may be examples of ethernet cables and the first communication protocol may be an ethernet communication protocol according to which the central processors 210 and the gateway processors 215 may communicate.

Additionally, the devices 230 may be coupled with respective gateway processors 215 or central processors 210 over various signal buses 245 that operate according to one or more different communication protocols. In some examples, the one or more different communication protocols may be lower capacity or bandwidth communication protocols with respect to the first communication protocol, such as a serial communication protocol. The gateway processors 215 may be configured to translate information between the first communication protocol (e.g., used to communicate information between the gateway processors 215 and the central processors 210) and the one or more different communication protocols (e.g., used between the gateway processors 215 and the devices 230). For example, the gateway processor 215-a may translate information that is communicated from the central processor 210-b to the device 230-a from the first communication protocol to a second communication protocol. Additionally, the gateway processor 215-a may translate information that is communicated from the device 230-a to the central processor 210-b from the second communication protocol to the first communication protocol. As such, the central processors 210 may communicate information with the devices 230 to control various operations and functions of the vehicle 205 (e.g., such as operations related to autonomous driving, alert notifications, etc.).

The zonal computing system of the vehicle 205 may include one or more DLAs 235 configured to perform operations of the components of the zonal computing system by utilizing one or more neural networks. In some cases, the use of machine learning models, such as neural networks, may help to reduce power consumption and reduce latency, among other performance operations. The DLAs 235 may include machine learning processes and other advanced computing techniques that may be utilized by the components of the zonal computing system. For example, a processor of the vehicle 205 (e.g., a central processor 210, a gateway processor 215) may transmit information to a DLA 235, which the DLA 235 may use as input into one or more neural networks. The DLA 235 may transmit responsive information to the processor that is output by the one or more neural networks based on the information received from the processor. For instance, the processor may transmit information gathered from one or more devices 230 to the DLA 235, and the DLA 235 may input the information into one or more neural networks, for example, for the purposes of supporting data analytics or autonomous driving, among other operations of the vehicle 205 supported by the processor. The DLA 235 may transmit outputs of the one or neural networks to the processor, which the processor may use in performing, for example, the data analytics, autonomous driving, etc.

A DLA 235 may be included in (e.g., embedded in) or coupled with a central processor 210 or a gateway processor 215. For example, in the example of FIG. 2, the central processor 210-a may be coupled with a DLA 235-a, the central processor 210-b may include (e.g., be embedded with) a DLA 235-b, the gateway processor 215-a may be coupled with a DLA 235-c, the gateway processor 215-e may include a DLA 235-d, or a combination thereof. It is noted, however, that FIG. 2 depicts an example configuration of DLAs 235 within the vehicle 205 and that any combination of components of the zonal computing system may include or be coupled with a respective DLA 235.

A memory system (e.g., a memory system 110) may be included in (e.g., embedded in) or coupled with a central processor 210 or a gateway processor 215 and coupled with a DLA 235. For example, in the example of FIG. 2, a first memory system may be coupled with the central processor 210-a and the DLA 235-a, a second memory system may be included (e.g., embedded) in the central processor 210-b and coupled with the DLA 235-b, a third memory system may be coupled with the gateway processor 215-a and the DLA 235-c, a fourth memory system may be included in the gateway processor 215-e and coupled with the DLA 235-d, or a combination thereof. It is noted, however, that FIG. 2 depicts an example configuration of memory systems within the vehicle 205 and that any combination of components of the zonal computing system may include or be coupled with a respective memory system.

In some cases, the system may use the devices 230 to measure or record various environmental factors or events. For example, one or more of the devices 230 may include or may be an example of cameras (e.g., rearview cameras, side view cameras) which may capture one or more video streams of the environment in the vicinity of the vehicle 205, such as videos streams of the rear of the vehicle 205. In some examples, the vehicle 205 may include multiple cameras, which may each capture video from different locations on the vehicle 205. For example, the vehicle 205 may include multiple rearview cameras, such as a center rearview camera, a left-side rearview camera, and a right-side rearview camera, among other rearview cameras that may be included in the vehicle 205. In some examples, the cameras may be configured to detect or determine one or more parameters associated with captured video streams, such as an illuminance of video streams, a contrast of video streams, or both. Additionally or alternatively, one or more cameras may be equipped with or may make use of non-visible light sensors, such as IR light detectors (e.g., IR light emitting diodes (LEDs), IR light cameras).

Additionally, the vehicle 205 may include one or more LiDAR sensors, which may be configured to detect objects and determine a distance to the objects (e.g., a distance between the vehicle 205 and a detected object). The vehicle 205 may also include one or more radar sensors, which may be configured to detect objects, determine distances to detects objects, determine velocity of detected objects, or any combination thereof. The vehicle 205 may also include one or more sound navigation and ranging (sonar) sensors, which may be configured to use ultrasonic sound waves to detect positions of one or more objects (e.g., relative to the vehicle 205).

The system 200 may use video streams and, in some cases, inputs from additional sensors (e.g., speedometers, accelerometers, thermometers, engine monitoring sensors, weather monitoring sensors) to generate a modified video stream 255 to display on one or more rearview mirrors 250 of the vehicle 205 (e.g., a rearview mirror 250-a, a rearview mirror 250-b, a rearview mirror 250-c). For example, the devices 230 (e.g., cameras, LiDAR, radar, sonar, and other sensors) may provide the video streams and additional inputs to the one or more DLAs 235 of the vehicle 205 (e.g., via respective gateway processors 215, central processors 210, or a combination thereof). In some examples, the rearview mirrors 250-b and 250-c may be referred to as side view mirrors. In some examples, the system 200 may generate respective modified video streams 255 for display on respective rearview mirrors 250. That is, different video streams captured by different rearview cameras may be independently modified and displayed on different rearview mirrors 250 (e.g., a first video stream captured by a center rearview camera may be modified and displayed at the rearview mirror 250-a, a second video stream captured by a left rearview camera may be modified and displayed at the rearview mirror 250-b, and so on).

The one or more DLAs 235 may process the video streams and additional inputs to generate the modified video stream 255. In some cases, the one or more DLAs 235 may use machine learning models (e.g., one or more neural networks) to detect objects or features of the received video streams. For example, the one or more DLAs 235 may detect vehicles in the vicinity of the vehicle 205, and may insert an indication of the vehicles into the modified video stream 255 (e.g., by outlining the vehicles, displaying the speed of vehicles, displaying a representation of a distance to vehicles). The one or more DLAs 235 may also detect and indicate other objects included in the environment associated with the vehicle 205, such as traffic signs, freeway exits, navigation information, and so on.

In some examples, the one or more DLAs 235 may detect artifacts in the received video streams and may modify or adjust the artifacts in the modified video stream 255. For example, the one or more DLAs 235 may detect a bright spot in the received video streams (e.g., headlights from other vehicles, overhead lights, streetlights, the sun) and reduce the brightness of (e.g., mask) the bright spot in the modified video stream 255. Additionally or alternatively, the one or more DLAs 235 may apply one or more filters to the modified video stream 255. For example, the one or more DLAs 235 may determine that a brightness or illuminance of the received video streams satisfies (e.g., meets or exceeds) a threshold, and in response may apply a filter to the modified video stream 255 to reduce the brightness. Additionally or alternatively, the one or more DLAs 235 may detect a low-light artifact in the received video streams (e.g., an object having an illuminance that fails to satisfy a threshold) and/or that an illuminance of the received video stream fails to satisfy (e.g., is less than, less than or equal to) the threshold. In some cases, the one or more DLAs 235 may enable night vision for the modified video stream 255, for example by using or activating the IR light detectors associated with the cameras.

The one or more DLAs 235 may output the modified video stream 255 to a display component of the vehicle 205. In some cases, the display component may display the modified video stream 255 on the rearview mirror 250, other displays of the vehicle 205 (e.g., side view mirrors, heads-up displays), or both. Additionally or alternatively, the display component may overlay (e.g., superimpose) the modified video stream or portions thereof on the rearview mirror 250, other displays, or both.

FIG. 3 illustrates an example of a system 300 that supports video stream augmentation using a deep learning device in accordance with examples as disclosed herein. Aspects of the system 300 may be included in or may be implemented by aspects of the systems 100 and 200, as described with reference to FIGS. 1 and 2. For example, the system 300 may be integrated in the system 200, such as in the vehicle 205, and may support recording and modifying video streams for display within the vehicle 205. In some examples, the system 300 may be implemented by (e.g., included in) a computing system, such as a zonal computing system of the vehicle 205 as described with reference to FIG. 2.

The system 300 may include a compute platform 305, which may include one or more systems or devices that support modifying video streams. For example, the compute platform 305 may include or may be an example of a DLA 310, which may be an example of the DLA 235. The DLA 310 may employ one or more machine learning models (e.g., neural networks) to analyze and modify data, such as video streams and other information, received from a set of sensors 340.

In some cases, the compute platform 305 may include additional system or devices (e.g., auxiliary systems) which may assist in analyzing and modifying the data. For example, the compute system may include a central processing units (CPU) 315, a graphics processing unit (GPU) 320, a digital signal processor (DSP) 325, or any combination thereof. The systems or devices included in the compute platform 305 may be coupled with each other or otherwise configured to communicate information, signaling, commands, data, or other aspects associated with analyzing the data and modifying video streams at the compute platform 305.

In some examples, the compute platform 305 may include or may utilize one or more memory devices to analyze the data and modify video streams. For example, the compute platform 305 may be coupled with or include a volatile memory device 330 (e.g., a DRAM device, an SRAM device, among other types of volatile memory devices), which may support access commands (e.g., read commands, write commands) issued from the compute platform 305. Additionally, the compute platform 305 may be coupled with or include a non-volatile memory device 335, such as a NAND device or other persistent memory device, which may support access commands issued from the compute platform 305. The volatile memory device 330, the non-volatile memory device 335, or both may be integrated with the compute platform 305 (e.g., within a same package), or may be included in separate packages or locations within the system 300 (e.g., within or coupled with the vehicle 205).

The compute platform 305 may be in communication with via signaling from the set of sensors 340, which may include any quantity of sensors 340. The set of sensors 340 may include multiple types sensors, such as: a set of cameras 345 positioned on the rear or sides (or both) of the system 300, including a left-side view camera 345-a (e.g., a left rearview camera), a rearview camera 345-b (e.g., a center rearview camera), and a right-side view camera 345-c (e.g., a right rearview camera); one or more LiDAR sensors; one or more sonar sensors; one or more radar sensors; one or more IR sensors or IR LEDs (e.g., coupled with or included in the set of cameras 345); or any combination thereof. Other types of sensors 340 that capture (e.g., track) information about the system 300 (e.g., the vehicle 205) or an environment associated with the system 300 may be included in the set of sensors 340. For example, the set of sensors 340 may include one or more night vision enabled cameras, one or more speedometers, one or more accelerometers, one or more navigation components (e.g., a global navigation satellite system (GNSS) component such as a global positioning system (GPS) component), or a combination thereof.

The sensors 340 may capture one or more inputs and one or more video streams from the environment surrounding the system 300 (e.g., the environment of a vehicle 205). For example, the set of cameras 345 may capture respective video streams, including a video stream from the rear or sides (or both) of the vehicle 205. In some examples, the video streams may include metadata associated with the captured video, such as an illuminance (e.g., brightness, brilliance) of the video or other parameters associated with captured images. Additionally, one or more of the LiDAR, sonar, and radar sensors may detect objects (e.g., near-by vehicles, intersections, pedestrians, street signs, animals, buildings, cyclists, and the like), as well as distance information and/or location information associated with the detected objects. For example, one or more of the LiDAR, sonar, and radar sensors may detect positions and velocities (e.g., speeds) of the detected objects (e.g., relative to the vehicle 205). For instance, one or more of the LiDAR, sonar, and radar sensors may detect a respective distance between the vehicle 205 and a detected object, a respective location of the detected object (e.g., relative to a location of the vehicle 205), a respective speed of the detected object, whether the detected object is stationary or moving, or a combination thereof. In some examples, IR light detectors may capture IR light information associated with the environment (e.g., 1R light emitted or reflected by objects in the environment). In some examples, a speedometer may capture a current speed of the vehicle 205, an accelerometer may capture an acceleration of the vehicle 205, and a navigation component may determine a current location (e.g., geographic location) of the vehicle 205. The sensors 340 may transmit the one or more inputs and one or more video streams to the compute platform 305.

The compute platform 305 may receive the one or more inputs and one or more video streams from the sensors 340 and may process the one or more inputs and one or more video streams to generate one or more modified output video streams. For example, the compute platform 305 may, using the DLA 310, analyze the video streams to identify one or more bright artifacts, one or more low-light artifacts, or both.

In some examples, a bright artifact may be a portion of the video streams (e.g., a detected object) with an illuminance which satisfies (e.g., meets or exceeds) a first threshold, while a low-light artifact may be a portion of the video streams with an illuminance that fails to satisfy (e.g., an illuminance which is less than, less than or equal to) a second threshold. As described herein, the illuminance of an object may refer to an intensity of light (e.g., an amount of light per unit of area) associated with the object received by the sensors 340. In some cases, the brightness of an object may refer to a perceived illuminance (e.g., a physiological measure of illuminance). Accordingly, the brightness of an object may correspond to or depend on the illuminance of an object. In some examples, the illuminance of an object may be determined based on a color of one or more pixels used to represent the object in the video stream. For example, the color of a pixel in a video stream may correspond to a particular red, green, blue (RGB) data value. Some RGB data values may be associated with relatively brighter representation of objects (e.g., brighter colors), while others may be associated with relatively darker representation of objects (e.g., darker colors). Thus, some RGB data values may be considered to satisfy the first threshold, and some other RGB data values may be considered to fail to satisfy the second threshold. Therefore, in some cases, RGB data values may be used to determine whether an object in a video stream is a bright artifact or a low-light artifact (e.g., or neither).

Upon identifying a bright artifact, the compute platform 305 (e.g., the DLA 310) may modify an output video stream to reduce the brightness of the bright artifact. For example, the compute platform 305 may insert a mask into the modified video stream to fully or partially cover or shade the bright artifact. Additionally or alternatively, the compute platform 305 may modify RGB data values of pixels used to represent the bright artifact such that the bright artifact appears darker. Upon identifying a low-light artifact, the compute platform 305 (e.g., the DLA 310) may modify a representation of the low-light artifact in the output video stream. For example, the compute platform 305 may increase a brightness of the low-light artifact in the output video stream (e.g., modify RGB data values of pixels used to represent the low-light artifact such that the low-light artifact appears brighter); annotate (e.g., labeling, outlining) the output video stream to indicate the low-light artifact; decrease the brightness of other artifacts included in the output video stream, such as non-low-light artifacts (e.g., artifacts which exceed the second threshold); or any combination thereof.

Additionally or alternatively, the compute platform 305 (e.g., the DLA 310) may analyze the one or more video streams to reduce a glare or otherwise improve visibility of the modified output video stream. For example, the compute platform 305 may identify whether the illuminance of a respective video stream (e.g., an overall illuminance, an average illuminance) satisfies one or more thresholds. If the compute platform 305 determines that the illuminance exceeds a first threshold, the compute platform may apply one or more video filters to the output video stream to reduce the illuminance. If the compute platform 305 determines that the illuminance is less than a second threshold, the compute platform 305 may apply a one or more video filters to increase the illuminance of the output video stream.

Additionally or alternatively, the compute platform 305 may transmit signaling to one or more sensors 340 (e.g., to the set of cameras 345) to activate or enable night-vision, such as by activating one or more IR light detectors. In some examples, the compute platform 305 may use IR light information received from the one or more IR light detectors in identifying low-light artifacts, modifying representations of low-light artifacts, or a combination thereof. For example, the IR light information may enable the compute platform 305 to detect objects within low-light portions of a video stream (e.g., that may otherwise be indistinguishable from surrounding objects of the video stream) and determine what the objects are (e.g., a vehicle, a street sign, an animal, and the like). As a result, the compute platform 305 may determine to modify representations of some objects within low-light portions of a video stream while leaving other objects within the low-light portions unmodified.

In some cases, the compute platform 305 may analyze the one or more video streams to identify (e.g., detect) one or more vehicles included in the one or more video streams (e.g., vehicles in the vicinity of the vehicle 205). For example, the compute platform 305 may perform a machine vision procedure using the video streams and, in some cases, data from other sensors of the sensors 340 (e.g., LiDAR data, radar data, sonar data). Additionally, the compute platform 305 may determine information associated with the one or more vehicles, such as a position of each vehicle (e.g., a distance to each vehicle relative to the vehicle 205), a speed of each vehicle (e.g., relative to the vehicle 205, relative to a stationary observer, an absolute speed of each vehicle), an identifier of each vehicle (e.g., a make and model, a color of each vehicle, an alpha-numeric identifier associated with each vehicle, such as a license plate), or any combination thereof. In some examples, the compute platform 305 may assign respective identifiers to each identified vehicle, which may be used in modifying the output video stream (e.g., inserted into the output video stream).

The compute platform 305 may use the determined information associated with the one or more vehicles to modify the output video stream. For example, the compute platform 305 may insert a respective annotation for one or more of the one or more vehicles into the output video stream. In some examples, the respective annotations may include an indication of the speed of each vehicle (e.g., represented as a number), the distance to each vehicle (e.g., represented as a number, represented as a distance bar), or both. Additionally, the compute platform 305 may insert a respective visual identifier for one or more of the vehicles. For example, the compute platform 305 may outline one or more of the vehicles (e.g., to increase a visibility of the vehicle within the output video stream). In some cases, the compute platform 305 may determine a respective color for the outlines using the associated information. For example, a relatively close or relatively fast vehicle may be outlined with a first color (e.g., red, orange, yellow), and a relatively far away or relatively slow vehicle may be outlined with a second color (e.g., green, blue).

The compute platform 305 may transmit one or more output video streams to a display component 350. The display component 350 may include one or more displays 355, such as a side view display 355-a (e.g., a left-side view display, a left-side view mirror, a left rearview mirror 250-b), a rearview display 355-b (e.g., a rearview mirror, such as a rearview mirror 250-a), a side view display 355-c (e.g., a right-side view mirror, a right-side view display, a right rearview mirror 250-c), or any combination thereof. In some cases, the display component 350 may include additional displays, such as a heads up display (HUD) or infotainment display in an interior of a vehicle.

The display component 350 may display the output video stream or use the output video stream to augment the one or more displays 355. For example, the display component 350 may stream or playback the output video stream on the one or more displays 355. Additionally or alternatively, the display component 350 may augment the one or more displays using the output video stream. For example, the display component may overlay the information associated with surrounding vehicles, masks or other modifications associated with artifacts (e. g., bright artifacts, low-light artifacts), or both on the one or more displays (e.g., overlay over a reflection from the rearview mirror, side view mirrors, or both). In some cases, the display component 350 may associate a particular display 355 with a camera 345. For example, the display component 350 may display modified video from the camera 345-a on the side view display 355-a, modified video from the camera 345-b on the rearview display 355-b, and modified video from the camera 345-c on the side view display 355-c. In some examples, the compute platform 305 may independently receive and modify respective video streams from the cameras 345 and transmit the modified video streams to corresponding displays 355.

In some examples, the compute platform 305 may transmit the output video stream or information determined as part of generating the output video stream to one or more other systems or sub-systems of the system 300. For example, the compute platform may transmit information associated with the one or more nearby vehicles (e.g., distance, speed, location information of the nearby vehicles) to a safety system 360. The safety system 360 may be operable to control aspects of the vehicle 205, such as activating a braking system, adjusting the speed of the vehicle 205, adjusting the direction of the vehicle 205, or any combination thereof. Accordingly, the safety system 360 may use information from the compute platform 305 to detect, and in some cases prevent, dangerous events. Additionally, the compute platform 305 may transmit information to an autonomous driving system 365 of the vehicle 205. The autonomous driving system 365 may use the information to control aspects of operating the vehicle.

By supporting video stream capture, modification, and display in accordance with the techniques described herein, user experience may be enhanced and vehicular safety may be increased. For example, the modified video stream displayed at displays 355 may provide additional information to a driver of the vehicle 205 relative to a traditional rearview or side view mirror, which may increase safety, reduce the likelihood of or prevent accidents, improve vision and awareness of objects within the environment of the vehicle, or a combination thereof. Additionally, by implementing such video stream modification using DLAs 310 which include one or more machine learning models trained to modify received video streams (e.g., identify objects or parameters associated with, process sensor inputs, perform video stream modification operations, and so on), power consumption and processing resources associated with video stream modification may be relatively limited, thereby reducing an effect of performing such video stream modification on a battery life of the vehicle system, among other benefits.

FIG. 4 shows a block diagram 400 of a deep learning device 420 that supports video stream augmentation using a deep learning device in accordance with examples as disclosed herein. The deep learning device 420 may be an example of aspects of a deep learning device as described with reference to FIGS. 1 through 3. The deep learning device 420, or various components thereof, may be an example of means for performing various aspects of video stream augmentation using a deep learning device as described herein. For example, the deep learning device 420 may include a reception component 425, a stream modification component 430, a transmission component 435, a vehicle identification component 440, a illuminance identification component 445, a vehicle analysis component 450, or any combination thereof. Each of these components may communicate, directly or indirectly, with one another (e.g., via one or more buses).

The reception component 425 may be configured as or otherwise support a means for receiving, at a deep learning device of a vehicle, a video stream from one or more cameras of the vehicle and one or more inputs from one or more other sensors of the vehicle, the deep learning device for performing one or more operations using a machine learning model. The stream modification component 430 may be configured as or otherwise support a means for modifying, using the deep learning device, the video stream based at least in part on one or more parameters associated with the video stream or the one or more inputs. The transmission component 435 may be configured as or otherwise support a means for transmitting the modified video stream from the deep learning device to a display component of the vehicle (e.g., a display component associated with a rearview mirror of the vehicle).

In some examples, the vehicle identification component 440 may be configured as or otherwise support a means for identifying, using the deep learning device, one or more second vehicles included in the video stream. In some examples, to support modifying the video stream, the stream modification component 430 may be configured as or otherwise support a means for inserting information associated with the one or more second vehicles into the video stream.

In some examples, the vehicle analysis component 450 may be configured as or otherwise support a means for determining, using the deep learning device, the information associated with the one or more second vehicles based at least in part on processing the video stream and the one or more inputs, where the information associated with the one or more second vehicles includes an indication of a respective distance between the vehicle and one or more of the one or more second vehicles, an indication of a respective speed of one or more of the one or more second vehicles, a respective identifier associated with one or more of the one or more second vehicles, or a combination thereof.

In some examples, to support inserting the information associated with the one or more second vehicles, the stream modification component 430 may be configured as or otherwise support a means for inserting a respective outline of one or more of the one or more second vehicles into the video stream.

In some examples, the transmission component 435 may be configured as or otherwise support a means for transmitting the information associated with the one or more second vehicles to a safety component of the vehicle.

In some examples, the illuminance identification component 445 may be configured as or otherwise support a means for identifying, using the deep learning device, one or more bright artifacts included in the video stream, the one or more bright artifacts having an illuminance that satisfies a threshold. In some examples, the stream modification component 430 may be configured as or otherwise support a means for reducing a illuminance of the one or more bright artifacts in the video stream based at least in part on the illuminance satisfying the threshold.

In some examples, the illuminance identification component 445 may be configured as or otherwise support a means for determining, using the deep learning device, whether an illuminance of the video stream satisfies a threshold. In some examples, to support modifying the video stream, the stream modification component 430 may be configured as or otherwise support a means for applying a video filter configured to reduce the illuminance of the video stream to the video stream based at least in part on the illuminance of the video stream satisfying the threshold.

In some examples, the illuminance identification component 445 may be configured as or otherwise support a means for identifying, using the deep learning device and based at least in part on processing the video stream and the one or more inputs, one or more low-light artifacts included in the video stream, the one or more low-light artifacts having an illuminance that fails to satisfy a threshold. In some examples, to support modifying the video stream, the stream modification component 430 may be configured as or otherwise support a means for modifying a representation of the one or more low-light artifacts based at least in part on the illuminance failing to satisfy the threshold.

In some examples, to support modifying the representation of the one or more low-light artifacts, the stream modification component 430 may be configured as or otherwise support a means for modifying the representation to increase the illuminance of the one or more low-light artifacts, inserting a respective outline of one or more of the one or more low-light artifacts into the video stream, reducing an illuminance of non-low-light artifacts included in the video stream, or a combination thereof.

In some examples, the one or more other sensors include one or more LiDAR sensors, one or more radar sensors, one or more sonar sensors, a speedometer, an accelerometer, one or more IR light detectors, or a combination thereof, and the one or more inputs include distance information associated with one or more objects included in the video stream, location information associated with the one or more objects, a speed of the vehicle, a respective speed of one or more of the one or more objects, an acceleration of the vehicle, IR light information associated with an environment of the vehicle, or a combination thereof.

In some examples, the deep learning device is coupled with a memory system of the vehicle, a processor of the vehicle, or both.

In some examples, the deep learning device includes a DLA.

In some examples, the one or more cameras include a rearview camera, a night vision enabled camera configured to detect IR light, or a combination thereof.

FIG. 5 shows a flowchart illustrating a method 500 that supports video stream augmentation using a deep learning device in accordance with examples as disclosed herein. The operations of method 500 may be implemented by a deep learning device or its components as described herein. For example, the operations of method 500 may be performed by a deep learning device as described with reference to FIGS. 1 through 4. In some examples, a deep learning device may execute a set of instructions to control the functional elements of the device to perform the described functions. Additionally, or alternatively, the deep learning device may perform aspects of the described functions using special-purpose hardware.

At 505, the method may include receiving, at a deep learning device of a vehicle, a video stream from one or more cameras of the vehicle and one or more inputs from one or more other sensors of the vehicle, the deep learning device for performing one or more operations using a machine learning model. The operations of 505 may be performed in accordance with examples as disclosed herein. In some examples, aspects of the operations of 505 may be performed by a reception component 425 as described with reference to FIG. 4.

At 510, the method may include modifying, using the deep learning device, the video stream based at least in part on one or more parameters associated with the video stream or the one or more inputs. The operations of 510 may be performed in accordance with examples as disclosed herein. In some examples, aspects of the operations of 510 may be performed by a stream modification component 430 as described with reference to FIG. 4.

At 515, the method may include transmitting the modified video stream from the deep learning device to a display component associated with a rearview mirror of the vehicle. The operations of 515 may be performed in accordance with examples as disclosed herein. In some examples, aspects of the operations of 515 may be performed by a transmission component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a deep learning device of a vehicle, a video stream from one or more cameras of the vehicle and one or more inputs from one or more other sensors of the vehicle, the deep learning device for performing one or more operations using a machine learning model, modifying, using the deep learning device, the video stream based at least in part on one or more parameters associated with the video stream or the one or more inputs; and transmitting the modified video stream from the deep learning device to a display component of the vehicle (e.g., a display component associated with a rearview mirror of the vehicle).

Aspect 2: The method, apparatus, or non-transitory computer-readable medium of aspect 1, further including operations, features, circuitry, logic, means, or instructions, or any combination thereof for identifying, using the deep learning device, one or more second vehicles included in the video stream, where modifying the video stream includes inserting information associated with the one or more second vehicles into the video stream.

Aspect 3: The method, apparatus, or non-transitory computer-readable medium of aspect 2, further including operations, features, circuitry, logic, means, or instructions, or any combination thereof for determining, using the deep learning device, the information associated with the one or more second vehicles based at least in part on processing the video stream and the one or more inputs, where the information associated with the one or more second vehicles includes an indication of a respective distance between the vehicle and one or more of the one or more second vehicles, an indication of a respective speed of one or more of the one or more second vehicles, a respective identifier associated with one or more of the one or more second vehicles, or a combination thereof.

Aspect 4: The method, apparatus, or non-transitory computer-readable medium of any of aspects 2 through 3, where inserting the information associated with the one or more second vehicles includes operations, features, circuitry, logic, means, or instructions, or any combination thereof for inserting a respective outline of one or more of the one or more second vehicles into the video stream.

Aspect 5: The method, apparatus, or non-transitory computer-readable medium of any of aspects 2 through 4, further including operations, features, circuitry, logic, means, or instructions, or any combination thereof for transmitting the information associated with the one or more second vehicles to a safety component of the vehicle.

Aspect 6: The method, apparatus, or non-transitory computer-readable medium of any of aspects 1 through 5, further including operations, features, circuitry, logic, means, or instructions, or any combination thereof for identifying, using the deep learning device, one or more bright artifacts included in the video stream, the one or more bright artifacts having an illuminance that satisfies a threshold, where modifying the video stream includes reducing a brightness of the one or more bright artifacts in the video stream based at least in part on the illuminance satisfying the threshold.

Aspect 7: The method, apparatus, or non-transitory computer-readable medium of any of aspects 1 through 6, further including operations, features, circuitry, logic, means, or instructions, or any combination thereof for determining, using the deep learning device, whether an illuminance of the video stream satisfies a threshold, where modifying the video stream includes applying a video filter configured to reduce the illuminance of the video stream to the video stream based at least in part on the illuminance of the video stream satisfying the threshold.

Aspect 8: The method, apparatus, or non-transitory computer-readable medium of any of aspects 1 through 7, further including operations, features, circuitry, logic, means, or instructions, or any combination thereof for identifying, using the deep learning device and based at least in part on processing the video stream and the one or more inputs, one or more low-light artifacts included in the video stream, the one or more low-light artifacts having an illuminance that fails to satisfy a threshold, where modifying the video stream includes modifying a representation of the one or more low-light artifacts based at least in part on the illuminance failing to satisfy the threshold.

Aspect 9: The method, apparatus, or non-transitory computer-readable medium of aspect 8, where modifying the representation of the one or more low-light artifacts includes operations, features, circuitry, logic, means, or instructions, or any combination thereof for modifying the representation to increase the illuminance of the one or more low-light artifacts, inserting a respective outline of one or more of the one or more low-light artifacts into the video stream, reducing an illuminance of non-low-light artifacts included in the video stream, or a combination thereof.

Aspect 10: The method, apparatus, or non-transitory computer-readable medium of any of aspects 1 through 9, where the one or more other sensors include one or more LiDAR sensors, one or more radar sensors, one or more sonar sensors, a speedometer, an accelerometer, one or more IR light detectors, or a combination thereof, and the one or more inputs include distance information associated with one or more objects included in the video stream, location information associated with the one or more objects, a speed of the vehicle, a respective speed of one or more of the one or more objects, an acceleration of the vehicle, IR light information associated with an environment of the vehicle, or a combination thereof.

Aspect 11: The method, apparatus, or non-transitory computer-readable medium of any of aspects 1 through 10, where the deep learning device is coupled with a memory system of the vehicle, a processor of the vehicle, or both.

Aspect 12: The method, apparatus, or non-transitory computer-readable medium of any of aspects 1 through 11, where the deep learning device includes a deep learning accelerator.

Aspect 13: The method, apparatus, or non-transitory computer-readable medium of any of aspects 1 through 12, where the one or more cameras include a rearview camera, a night vision enabled camera configured to detect IR light, or a combination thereof.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 14: An apparatus, including: one or more cameras of a vehicle; one or more sensors of the vehicle; a display component associated with a rearview mirror of the vehicle; and a deep learning device configured to perform one or more operations using a machine learning model, where the deep learning device is further configured to: receive a video stream from the one or more cameras and one or more inputs from the one or more sensors; modify the video stream based at least in part on one or more parameters associated with the video stream or the one or more inputs; and transmit the modified video stream to the display component associated with the rearview mirror of the vehicle.

Aspect 15: The apparatus of aspect 14, where the deep learning device is further configured to: identify one or more second vehicles included in the video stream, where, to modify the video stream, the deep learning device is configured to: insert information associated with the one or more second vehicles into the video stream.

Aspect 16: The apparatus of aspect 15, where the deep learning device is further configured to: determine the information associated with the one or more second vehicles based at least in part on processing the video stream and the one or more inputs, where the information associated with the one or more second vehicles includes an indication of a respective distance between the vehicle and one or more of the one or more second vehicles, an indication of a respective speed of one or more of the one or more second vehicles, a respective identifier associated with one or more of the one or more second vehicles, or a combination thereof.

Aspect 17: The apparatus of any of aspects 15 through 16, where, to insert the information associated with the one or more second vehicles, the deep learning device is configured to: insert a respective outline of one or more of the one or more second vehicles into the video stream.

Aspect 18: The apparatus of any of aspects 15 through 17, where the deep learning device is further configured to: transmit the information associated with the one or more second vehicles to a safety component of the vehicle.

Aspect 19: The apparatus of any of aspects 14 through 18, where the deep learning device is further configured to: identify one or more bright artifacts included in the video stream, the one or more bright artifacts having an illuminance that satisfies a threshold, where, to modify the video stream, the deep learning device is configured to: reduce a brightness of the one or more bright artifacts in the video stream.

Aspect 20: The apparatus of any of aspects 14 through 19, where the deep learning device is further configured to: determine whether an illuminance of the video stream satisfies a threshold, where, to modify the video stream, the deep learning device is configured to: apply a video filter configured to reduce the illuminance of the video stream to the video stream based at least in part on the illuminance of the video stream satisfying the threshold.

Aspect 21: The apparatus of any of aspects 14 through 20, where the deep learning device is further configured to: identify, using the deep learning device and based at least in part on processing the video stream and the one or more inputs, one or more low-light artifacts included in the video stream, the one or more low-light artifacts having an illuminance that fails to satisfy a threshold, where, to modify the video stream, the deep learning device is configured to: modify a representation of the one or more low-light artifacts based at least in part on the illuminance failing to satisfy the threshold.

Aspect 22: The apparatus of any of aspects 14 through 21, where the deep learning device, the one or more cameras, and the one or more sensors are included in a zonal computing system of the vehicle, the zonal computing system further including: a central processor configured to communicate with a remote server and a plurality of zones associated with the zonal computing system; and a gateway processor coupled with the central processor and associated with a zone of the plurality of zones, where the gateway processor is configured to route communications between the central processor and components of the zonal computing system, and where the deep learning device is configured to receive the video stream and the one or more inputs via the gateway processor.

An apparatus is described. The following provides an overview of aspects of the apparatus as described herein:

Aspect 23: An apparatus, including: a deep learning device; and a controller coupled with the deep learning device and operable to cause the apparatus to: receive, at the deep learning device, a video stream from one or more cameras of a vehicle and one or more inputs from one or more other sensors of the vehicle; modify, at the deep learning device, the video stream based at least in part on one or more parameters associated with the video stream or the one or more inputs; and transmit the modified video stream from the deep learning device to a display component associated with a rearview mirror of the vehicle.

Aspect 24: The apparatus of aspect 23, where the controller is further configured to cause the apparatus to: identify, at the deep learning device, one or more second vehicles included in the video stream, where to modify the video stream, the controller is configured to cause the apparatus to: insert information associated with the one or more second vehicles into the video stream.

Aspect 25: The apparatus of aspect 24, where the controller is further configured to cause the apparatus to: determine, at the deep learning device, the information associated with the one or more second vehicles based at least in part on processing the video stream and the one or more inputs, where the information associated with the one or more second vehicles includes an indication of a respective distance between the vehicle and one or more of the one or more second vehicles, an indication of a respective speed of one or more of the one or more second vehicles, a respective identifier associated with one or more of the one or more second vehicles, or a combination thereof.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as IR, radio, and microwave, then the coaxial cable, fiber optic cable, twisted pair, DSL, or wireless technologies such as IR, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, at a deep learning device of a vehicle, a respective video stream from each of a plurality of cameras of the vehicle and one or more inputs from one or more other sensors of the vehicle, the deep learning device for performing one or more operations using a machine learning model;
   modifying, using the deep learning device, a first video stream based at least in part on one or more first parameters associated with the first video stream or the one or more inputs and a second video stream based at least in part on one or more second parameters associated with the second video stream or the one or more inputs, wherein the one or more first parameters are different than the one or more second parameters;
   transmitting the modified first video stream from the deep learning device to a first display component overlaid on a reflective surface of a first rearview mirror of the vehicle based at least in part on associating the modified first video stream with the first display component, wherein the first display component is able to receive a plurality of modified video streams prior to associating the modified first video stream with the first display component; and
   transmitting the modified second video stream from the deep learning device to a second display component overlaid on a reflective surface of a second rearview mirror of the vehicle based at least in part on associating the modified second video stream with the second display component, wherein the second display component is able to receive the plurality of modified video streams prior to associating the modified second video stream with the second display component.

2. The method of claim 1, further comprising:
   identifying, using the deep learning device, one or more second vehicles included in the first video stream, wherein modifying the first video stream comprises:
   inserting information associated with the one or more second vehicles into the first video stream.

3. The method of claim 2, further comprising:
   determining, using the deep learning device, the information associated with the one or more second vehicles based at least in part on processing the first video stream and the one or more inputs, wherein the information associated with the one or more second vehicles comprises an indication of a respective distance between the vehicle and one or more of the one or more second vehicles, an indication of a respective speed of one or more of the one or more second vehicles, a respective identifier associated with one or more of the one or more second vehicles, or a combination thereof.

4. The method of claim 2, wherein inserting the information associated with the one or more second vehicles comprises:
   inserting a respective outline of one or more of the one or more second vehicles into the first video stream.

5. The method of claim 2, further comprising:
   transmitting the information associated with the one or more second vehicles to a safety component of the vehicle.

6. The method of claim 1, further comprising:
   identifying, using the deep learning device, one or more bright artifacts included in the first video stream, the one or more bright artifacts having an illuminance that satisfies a threshold, wherein modifying the first video stream comprises:
   reducing a brightness of the one or more bright artifacts in the first video stream based at least in part on the illuminance satisfying the threshold.

7. The method of claim 1, further comprising:
   determining, using the deep learning device, whether an illuminance of the first video stream satisfies a threshold, wherein modifying the first video stream comprises:
   applying a video filter configured to reduce the illuminance of the first video stream to the first video stream based at least in part on the illuminance of the first video stream satisfying the threshold.

8. The method of claim 1, further comprising:
   identifying, using the deep learning device and based at least in part on processing the first video stream and the one or more inputs, one or more low-light artifacts included in the first video stream, the one or more low-light artifacts having an illuminance that fails to satisfy a threshold, wherein modifying the first video stream comprises:
modifying a representation of the one or more low-light artifacts based at least in part on the illuminance failing to satisfy the threshold.

9. The method of claim 8, wherein modifying the representation of the one or more low-light artifacts comprises:
modifying the representation to increase the illuminance of the one or more low-light artifacts, inserting a respective outline of one or more of the one or more low-light artifacts into the first video stream, reducing an illuminance of non-low-light artifacts included in the first video stream, or a combination thereof.

10. The method of claim 1, wherein the one or more other sensors comprise one or more light detection and ranging sensors, one or more radar sensors, one or more sonar sensors, a speedometer, an accelerometer, one or more infrared light detectors, or a combination thereof, and wherein the one or more inputs comprise distance information associated with one or more objects included in the first video stream or the second video stream, location information associated with the one or more objects, a speed of the vehicle, a respective speed of one or more of the one or more objects, an acceleration of the vehicle, infrared light information associated with an environment of the vehicle, or a combination thereof.

11. The method of claim 1, wherein the deep learning device is coupled with a memory system of the vehicle, a processor of the vehicle, or both.

12. The method of claim 1, wherein the deep learning device comprises a deep learning accelerator.

13. The method of claim 1, wherein the plurality of cameras comprises a rearview camera, a night vision enabled camera configured to detect infrared light, or a combination thereof.

14. An apparatus, comprising:
a plurality of cameras of a vehicle;
one or more sensors of the vehicle;
a first display component overlaid on a reflective surface of a first rearview mirror of the vehicle;
a second display component overlaid on a reflective surface of a second rearview mirror of the vehicle; and
a deep learning device configured to perform one or more operations using a machine learning model, wherein the deep learning device is further configured to:
receive a respective video stream from each of the plurality of cameras and one or more inputs from the one or more sensors;
modify a first video stream based at least in part on one or more first parameters associated with the first video stream or the one or more inputs and a second video stream based at least in part on one or more second parameters associated with the second video stream or the one or more inputs, wherein the one or more first parameters are different than the one or more second parameters;
transmit the modified second video stream to the first display component overlaid on the reflective surface of the first rearview mirror of the vehicle based at least in part on associating the modified first video stream with the first display component, wherein the first display component is able to receive a plurality of modified video streams prior to associating the modified first video stream with the first display component; and
transmit the modified second video stream to the second display component overlaid on the reflective surface of the second rearview mirror of the vehicle, wherein the modified first video stream is different than the modified second video stream based at least in part on associating the modified second video stream with the second display component, wherein the second display component is able to receive the plurality of modified video streams prior to associating the modified second video stream with the second display component.

15. The apparatus of claim 14, wherein the deep learning device is further configured to:
identify one or more second vehicles included in the first video stream, wherein, to modify the first video stream, the deep learning device is configured to:
insert information associated with the one or more second vehicles into the first video stream.

16. The apparatus of claim 15, wherein the deep learning device is further configured to:
determine the information associated with the one or more second vehicles based at least in part on processing the first video stream and the one or more inputs, wherein the information associated with the one or more second vehicles comprises an indication of a respective distance between the vehicle and one or more of the one or more second vehicles, an indication of a respective speed of one or more of the one or more second vehicles, a respective identifier associated with one or more of the one or more second vehicles, or a combination thereof.

17. The apparatus of claim 15, wherein, to insert the information associated with the one or more second vehicles, the deep learning device is configured to:
insert a respective outline of one or more of the one or more second vehicles into the first video stream.

18. The apparatus of claim 15, wherein the deep learning device is further configured to:
transmit the information associated with the one or more second vehicles to a safety component of the vehicle.

19. The apparatus of claim 14, wherein the deep learning device is further configured to:
identify one or more bright artifacts included in the first video stream, the one or more bright artifacts having an illuminance that satisfies a threshold, wherein, to modify the first video stream, the deep learning device is configured to:
reduce a brightness of the one or more bright artifacts in the first video stream.

20. The apparatus of claim 14, wherein the deep learning device is further configured to:
determine whether an illuminance of the first video stream satisfies a threshold, wherein, to modify the first video stream, the deep learning device is configured to:
apply a video filter configured to reduce the illuminance of the first video stream to the first video stream based at least in part on the illuminance of the first video stream satisfying the threshold.

21. The apparatus of claim 14, wherein the deep learning device is further configured to:
identify, using the deep learning device and based at least in part on processing the first video stream and the one or more inputs, one or more low-light artifacts included in the first video stream, the one or more low-light artifacts having an illuminance that fails to satisfy a threshold, wherein, to modify the first video stream, the deep learning device is configured to:

modify a representation of the one or more low-light artifacts based at least in part on the illuminance failing to satisfy the threshold.

22. The apparatus of claim 14, wherein the deep learning device, the plurality of cameras, and the one or more sensors are included in a zonal computing system of the vehicle, the zonal computing system further comprising:
   a central processor configured to communicate with a remote server and a plurality of zones associated with the zonal computing system; and
   a gateway processor coupled with the central processor and associated with a zone of the plurality of zones, wherein the gateway processor is configured to route communications between the central processor and components of the zonal computing system, and wherein the deep learning device is configured to receive the first video stream, the second video stream, and the one or more inputs via the gateway processor.

23. An apparatus, comprising:
   a deep learning device; and
   processing circuitry coupled with the deep learning device and operable to cause the apparatus to:
      receive, at the deep learning device, a respective video stream from each of a plurality of cameras of a vehicle and one or more inputs from one or more other sensors of the vehicle;
      modify, at the deep learning device, a first video stream based at least in part on one or more first parameters associated with the first video stream or the one or more inputs and a second video stream based at least in part one or more second parameters associated with the second video stream or the one or more inputs, wherein the one or more first parameters are different than the one or more second parameters;
      transmit the modified first video stream from the deep learning device to a first display component overlaid on a reflective surface of a first rearview mirror of the vehicle based at least in part on associating the modified first video stream with the first display component, wherein the first display component is able to receive a plurality of modified video streams prior to associating the modified first video stream with the first display component; and
      transmit the modified second video stream from the deep learning device to a second display component overlaid on a reflective surface of a second rearview mirror of the vehicle based at least in part on associating the modified second video stream with the second display component, wherein the second display component is able to receive the plurality of modified video streams prior to associating the modified second video stream with the second display component.

24. The apparatus of claim 23, wherein the processing circuitry is further configured to cause the apparatus to:
   identify, at the deep learning device, one or more second vehicles included in the first video stream, wherein to modify the first video stream, the processing circuitry is configured to cause the apparatus to:
   insert information associated with the one or more second vehicles into the first video stream.

25. The apparatus of claim 24, wherein the processing circuitry is further configured to cause the apparatus to:
   determine, at the deep learning device, the information associated with the one or more second vehicles based at least in part on processing the first video stream and the one or more inputs, wherein the information associated with the one or more second vehicles comprises an indication of a respective distance between the vehicle and one or more of the one or more second vehicles, an indication of a respective speed of one or more of the one or more second vehicles, a respective identifier associated with one or more of the one or more second vehicles, or a combination thereof.

* * * * *